United States Patent

Chapman

[11] Patent Number: 5,811,160
[45] Date of Patent: *Sep. 22, 1998

[54] CARVABLE ARTIFICIAL PUMPKIN

[76] Inventor: Jeffrey A. Chapman, 5800 E. Thomas Rd., Suite 104, Scottsdale, Ariz. 85251

[*] Notice: The term of this patent shall not extend beyond the expiration date of Pat. No. 5,491,007.

[21] Appl. No.: 720,788

[22] Filed: Oct. 3, 1996

Related U.S. Application Data

[62] Division of Ser. No. 485,920, Jun. 7, 1995, Pat. No. 5,624,614, which is a division of Ser. No. 369,704, Jan. 6, 1995, Pat. No. 5,491,007, which is a division of Ser. No. 29,466, Mar. 11, 1993, Pat. No. 5,397,609.

[51] Int. Cl.$^6$ .................................................. A41G 1/00
[52] U.S. Cl. ............................ 428/17; 428/21; 428/36.5
[58] Field of Search .............................. 428/17, 21, 36.5

[56] References Cited

U.S. PATENT DOCUMENTS

| | | | |
|---|---|---|---|
| 396,252 | 1/1889 | Beilder | 40/540 |
| 764,207 | 7/1904 | Robinson | 428/17 X |
| 848,938 | 4/1907 | Tyndall | 40/540 |
| 2,428,133 | 9/1947 | Yogan | 40/540 |
| 3,329,750 | 7/1967 | Growald | 264/54 X |
| 3,468,499 | 9/1969 | Rodgers | 264/41 X |
| 3,642,965 | 2/1972 | Nuttall et al. | 264/45.7 X |
| 3,875,275 | 4/1975 | Lemelson | 428/319.7 X |
| 3,904,339 | 9/1975 | Dunn | 264/309 X |
| 3,939,236 | 2/1976 | Hahn | 264/53 |

(List continued on next page.)

FOREIGN PATENT DOCUMENTS

| | | | |
|---|---|---|---|
| 413955 | 7/1934 | United Kingdom | 264/48 |
| 1015758 | 1/1966 | United Kingdom | 264/54 |

OTHER PUBLICATIONS

"Sun Proof Igloo," *Science News Letter* p. 7 (Jan. 2, 1960).
Binks Industrial Nozzles, Catalog, IN–2 (Mar. 1980).
Resin Technology Co., Guide Specification for Urethane Foam Roofing System (Sep. 1982).
Resin Technology Co., Permax –108 Elastomeric Coating, Technical Information Sheet (Sep. 1982).
Binks B–Series High Pressure Pumps, Bulletin A98–95R–7 (Aug. 1990).
Kashiwagi et al., "Performance Analysis of GE Silicone Coated Polyurethane Foam Systems," Arizona State University College of Engineering, Article No. CDS4624 (May 1991).
SWD Urethane Company, SWD–115/250 Spray Foam Product Information Sheet (Dec. 1991).
Graco Plural Component Proporationing Systems (Apr. 1992).
Gemmy Industries, Artificial Pumpkin Product (Nov. 1992).
Catalog, Hyman Products, Inc., "Pumpster Family" soft–sculpture pumpkin products (1987–89).

*Primary Examiner*—Henry F. Epstein
*Attorney, Agent, or Firm*—Louis J. Hoffman

[57] ABSTRACT

The invention is in the field of three-dimensional hollow novelty items and their manufacture, particularly items such as artificial pumpkins that the consumer desires to carve or alter after purchase. Disclosed is a carvable novelty article, such as an artificial Halloween pumpkin, comprising a polyurethane shell substantially surrounding an interior volume and having a thin coating, such as an acrylic elastomer, on the exterior surface of the shell. The carvable article can be formed by an inventive process in which polyurethane foam material, such as material having a nominal density of about 2.5–3.0 pounds per cubic foot, is sprayed from a nozzle rotating with respect to the inside of a mold. After the polyurethane foam article and the mold are separated, the article is coated with an elastomeric coating, such as an acrylic material that is applied as a liquid. Thus, the inventive articles, including those made in accordance with the inventive process, can be used as three-dimensional hollow novelty items of a variety of shapes. In addition, the inventive articles, such as Halloween pumpkins, are carvable, reusable, and can be used with a light source.

29 Claims, 3 Drawing Sheets

U.S. PATENT DOCUMENTS

| | | | |
|---|---|---|---|
| 4,123,307 | 10/1978 | Lemelson | 264/311 X |
| 4,463,951 | 8/1984 | Kumasaka et al. | 273/58 X |
| 4,749,533 | 6/1988 | Payne | 264/45.7 X |
| 4,867,922 | 9/1989 | Zuccato | 264/40.1 |
| 4,891,266 | 1/1990 | Keith | 428/331 |
| 4,987,615 | 1/1991 | Massey | 2/206 |
| 5,063,253 | 11/1991 | Gansen et al. | 521/159 |
| 5,100,926 | 3/1992 | Kondo et al. | 521/163 |
| 5,123,659 | 6/1992 | Williams | 264/46.9 X |
| 5,171,346 | 12/1992 | Hallet | 264/46.9 X |
| 5,397,609 | 3/1995 | Chapman | 428/17 |
| 5,491,007 | 2/1996 | Chapman | 428/17 |
| 5,492,644 | 2/1996 | Cutts | 428/67 X |
| 5,624,614 | 4/1997 | Chapman | 428/17 X |

CARVABLE ARTIFICIAL PUMPKIN

CROSS REFERENCE TO RELATED APPLICATIONS

This is a division of application Ser. No. 08/485,920, filed Jun. 7, 1995, now U.S. Pat. No. 5,624,614, which is a division of application Ser. No. 08/369,704, filed Jan. 6, 1995, now U.S. Pat. No. 5,491,007, which is a division of Ser. No. 08/029,466, filed Mar. 11, 1993, now U.S. Pat. No. 5,397,609.

BACKGROUND OF THE INVENTION

The invention is in the field of novelty items and their manufacture, particularly items such as artificial pumpkins that the consumer desires to carve or alter after purchase.

Known artificial novelty articles such as Halloween jack-o-lanterns are typically manufactured from paper products, ceramics, or thin, soft plastic and, while useful for display, are not suitable for carving by the purchaser or safe for use with lights. To honor the holiday tradition of carving pumpkins, therefore, members of the public have before now been forced to purchase real pumpkins. However, real pumpkins are perishable and therefore will rot after a time. They are messy and smelly to carve. They cannot be reused in subsequent years. There is a need, therefore, for novel application of known materials to articles that can be carved, such as artificial pumpkins that are durable, non-flammable, and carvable.

In addition, use of polyurethane foam has been limited to applications in which it can be sprayed on a planar, or nearly planar surface, such as roofing, or used in liquid form for injection molding into solid structures. However, there has before now been no known way of applying polyurethane foam to create a three-dimensional hollow structure.

SUMMARY OF THE INVENTION

It is an object of the invention, therefore, to provide new and improved novelty items that are capable of being carved.

It is another object of the invention to provide new and improved novelty items that are durable and capable of being reused.

It is another object of the invention to provide new and improved ways of applying polyurethane foam to create a three-dimensional hollow structure.

It is another object of the invention to provide new and improved artificial pumpkins.

It is another object of the invention to provide new and improved artificial Halloween jack-o-lantems that can be used with a non-flammable light source.

The above and other objects of the invention are achieved in one disclosed embodiment through a carvable article comprising a polyurethane shell substantially surrounding an interior volume and having a thin, elastomeric coating, such as an acrylic, on the exterior surface of the shell. When formed as a novelty artificial pumpkin, the article can have features such as a stem-shaped protrusion on the top, an opening to the interior on the bottom, which may form a flat area on which the shell can be rested, and a painted, textured exterior. The shell can be shaped irregularly, as a spheroid, or as a pumpkin. In further embodiments, the coating can be textured or painted. One suitable polyurethane material has a nominal density of about 2.5–3.0 pounds per cubic foot.

The carvable article can be formed by an inventive process in which polyurethane foam material is sprayed on the inside of a rotating hollow mold with a spray nozzle, or in which the foam is sprayed from a rotating nozzle inside the mold. The nozzle may be placed at the end of a static mixing tube, in which the polyurethane foam is mixed from its components. In preferred embodiments, polyurethane foam components having slow reactive times are used, and the mold is pre-treated with a mold-release agent. After the polyurethane foam article and the mold are separated, the article is coated with an elastomeric coating, such as an acrylic material that is applied as a liquid.

Thus, the inventive articles, including those made in accordance with the inventive process, can be used as three-dimensional hollow novelty items of a variety of shapes. In addition, the inventive articles, such as Halloween pumpkins, are carvable, reusable, and can be used with a light source.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures. Throughout the figures, a common reference numeral is intended to refer to the same element.

DETAILED DESCRIPTION

Figure 1:
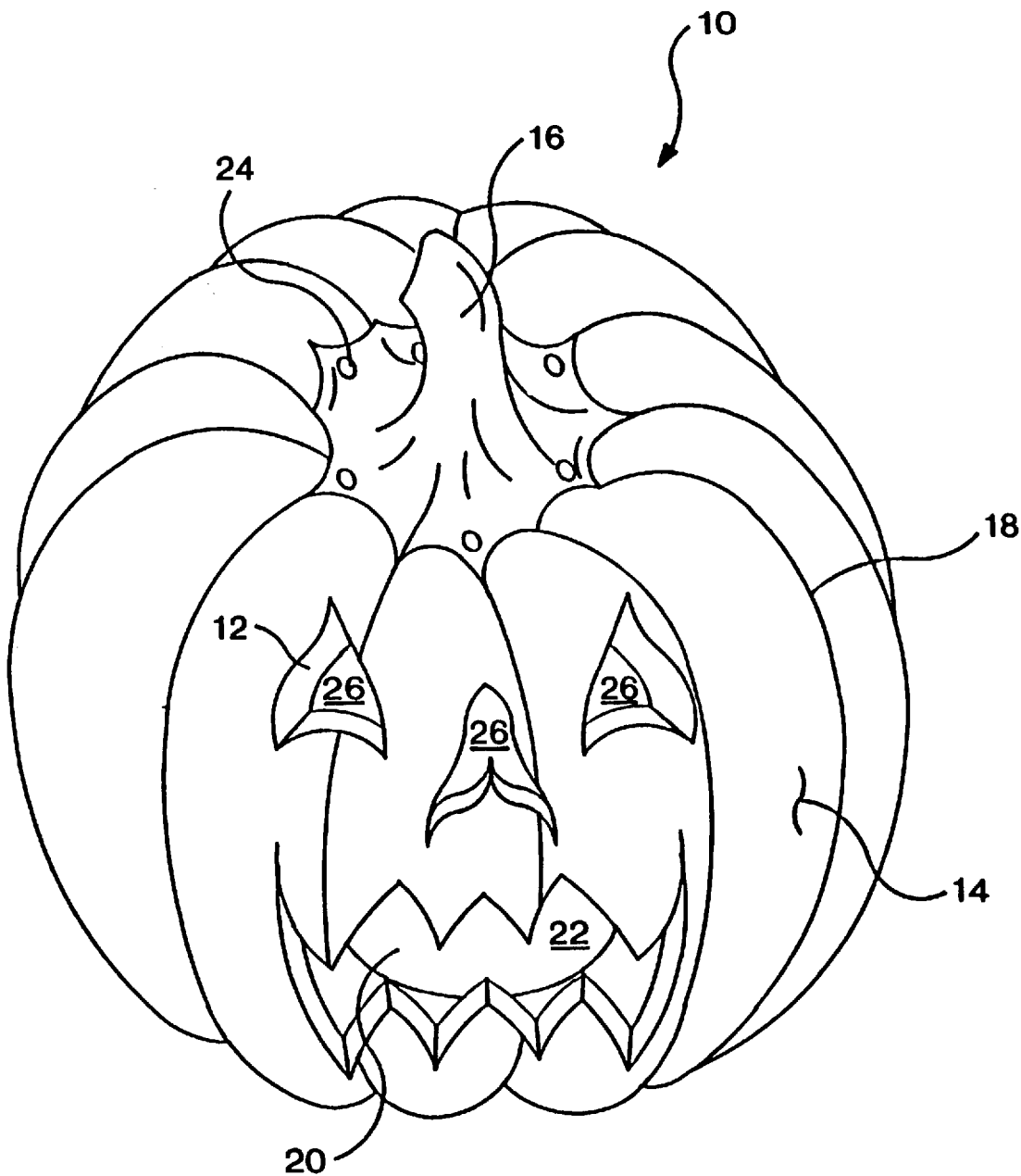
FIG. 1 shows a view of an example inventive novelty item, namely a pumpkin, manufactured in accordance with the inventive process and carved by the user, revealing the internal structure.

FIG. 1 shows a view of a generally globe-shaped novelty pumpkin 10 manufactured in accordance with the invention after it has been carved by the user. The pumpkin is formed of a substrate 12 of sprayed polyurethane foam material covered by an fluid-applied elastomer coating 14, such as silicone, liquid polyurethane, or various acrylics.

Substrate material 12 should be of a generally uniform thickness, but it is not necessary that the thickness be completely uniform. Polyurethane foam material having a nominal density of about 2.5–3.0 pounds per cubic foot has been found to be suitable for carving with simple tools—such as a pocketknife—in thicknesses of about one inch, which is enough to provide sufficient strength without excessive weight or expense.

Various optional styling can be applied to the shape of pumpkin 10, such as the inclusion of stem 16 or longitudinal indentations 18. The main body of pumpkin 10 can be shaped as a sphere, or as an irregular sphere that is partially flattened at the bottom, top, or even one or more sides. Also, the sides of pumpkin 10 can be textured, if desired.

The bottom of pumpkin 10 has a hole 20, visible through the pumpkin's mouth 22 in the example in FIG. 1, the origin of which is explained below. In the final product, hole 20 can be covered or enlarged, as desired. Hole 20 allows the insertion of an optional light source. Also, hole 20 or the material around it can be shaped to serve as a stable base or support for pumpkin 10, preventing it from rolling.

As seen in FIG. 1, holes 22, 26 are shaped and positioned to visually represent a face.

Coating 14 can be suitably colored, such as pumpkin orange. Besides serving decorative functions, coating 14 serves to protect substrate 12 from water or degradation from ultraviolet radiation. Therefore, coating 14 should have a material composition and color combination that is opaque in the appropriate range of wavelengths. Coating 14 should also be non-reactive with the underlying polyurethane foam, although a non-compatible coating can also be used, if it is placed on top of an intermediate, protective layer compatible with both polyurethane foam and the outer coating. One particular material found to be suitable for use as coating 14 is known as "Permax-108" acrylic coating manufactured by Resin Technology Company, which is based on resins manufactured by Rohm & Haas. A coating thickness of 12–24 mils is recommended. Further details of a suitable coating and polyurethane materials and application techniques and equipment are included in Resin Technology Company's "Guide Specification" and "Technical Information Sheet" for Permax-108, which are hereby incorporated by reference. Paint or other finishes compatible with coating 14 can be added on top of coating 14, to add further details, such as brown paint for stem 16.

If it is desired to have the pumpkin serve as a real jack-o-lantem, with a light source placed inside it, it is desirable to include ventilation holes 24, placed in any suitable location for aesthetics and functionality. In FIG. 1, holes 24 are shown located near stem 16, so that they are not obtrusive but can prevent rising heat from building up inside pumpkin 10.

Figure 2:
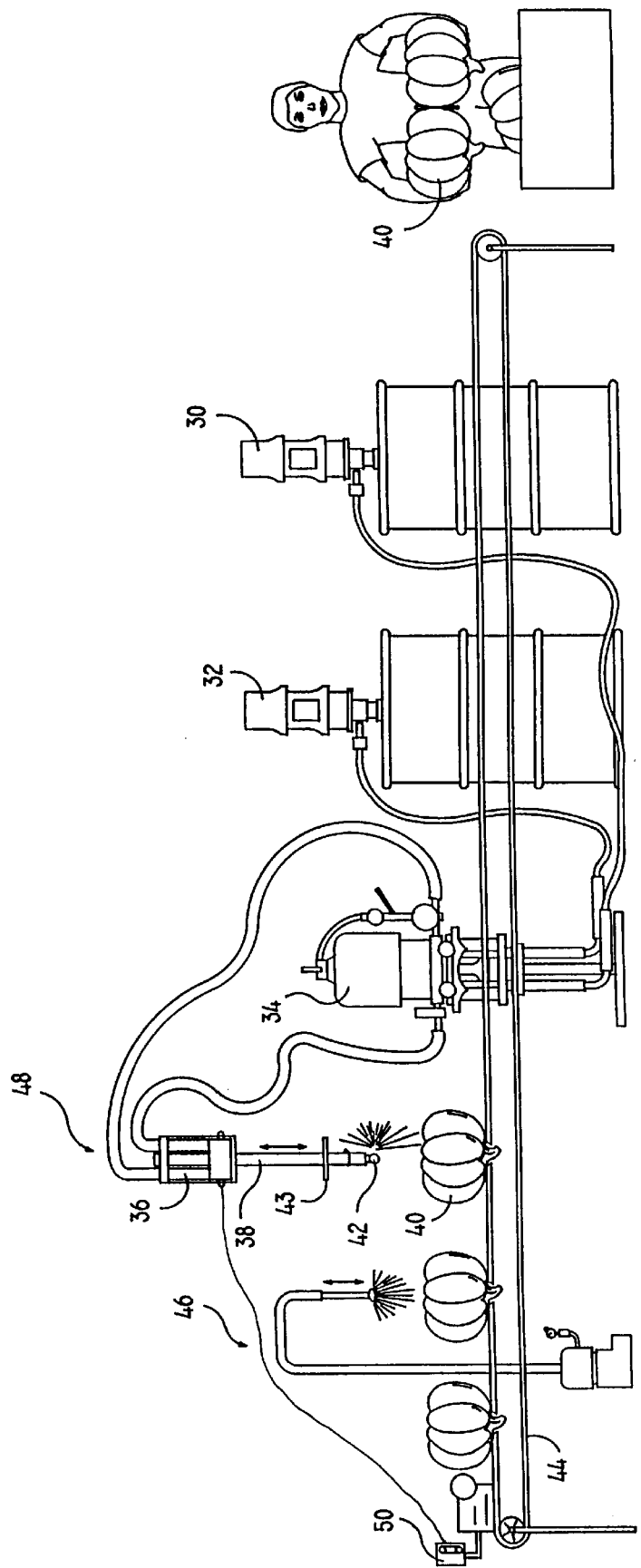
FIG. 2 shows a view of one embodiment of equipment that can be used in the system of the invention to manufacture the example item of FIG. 1.

FIG. 2 shows a view of one embodiment of manufacturing equipment useful with the invention. Polyurethane foam is typically sold and transported as two chemical components, which are mixed together during the spraying process. Tanks 30 and 32 in FIG. 2 contain those "A" and "B" elements. Tanks 30 and 32 are connected by hose to heated spraying outfit 34, which raises the temperature of the "A" and "B" elements in preparation for their mixing. Any of the B-Series heated spraying outfits in the Model "42-" series sold by Binks Manufacturing Company of Franklin Park, Ill., or the equivalent, are suitable for use as spraying outfit 34.

After being heated, the "A" and "B" elements are passed through manifold 36 into static mixing tube 38, in which they are blended together thoroughly. Manifold 36 is used to introduce two materials before they enter a mixer, and typically include a solvent flushing port for flushing the manifold, the mixer, and the nozzle, to prevent the materials from curing inside the equipment after spraying stops. Manifold 36 includes a single lever, with two ball valves, for controlling the flow of the "A" and "B" materials into the mixer, and another lever and ball valve combination controls the entry of solvent. Check valves inside manifold 36 prevent back-flow along any of the three lines. One suitable device for use as manifold 36 is part number 903-142 sold by Graco Inc. of Minneapolis, Minn., which is controlled by air signals issued by a controller. Manual sprayers are also available from the same company.

Static mixing tube 38 consists of a tube with a helical interior, to blend the "A" and "B" components thoroughly into the proper mix before the resulting polyurethane foam is sprayed into place. Suitable tubes are available from Graco Inc. or other manufacturers.

Further information about the above-described polyurethane-application equipment can be found in Bulletin A98-95R-7 from Binks, and Graco's pamphlet entitled "Plural Component Proportioning Systems," both of which are hereby incorporated by reference.

During manufacture, static mixing tube 38 will be inserted into the interior of mold 40, through a hole, which will result in the formation of hole 20 shown in FIG. 1. Mold 40 can be a hinged, two-piece, steel or fiberglass mold. The interior of mold 40 can have bulges or texture, if it is desired to have irregular shape or texture on the pumpkin. At one end is an extension for stem 16, which can also be used by automated equipment to handle the otherwise-round mold 40 more easily. Mold can preferably open along a longitudinal line, to permit easy extraction of stem 16 in the formed pumpkin and to allow the resulting seams to be somewhat hidden.

It is preferred to select a polyurethane foam material that has a slow reaction time, to permit mixing in static mixing tube 38 while still allowing time for the polyurethane foam to exit the tube and be sprayed onto the inside of mold 40. For example, one material found to have suitable density characteristics and slow reaction time is product number "SWD-250/Slow" spray foam manufactured by SWD Urethane Company of Mesa, Ariz., although other foams may be used. That particular foam has a "cream time" of 4–6 seconds and will take 18–24 seconds before it begins to rise.

Nozzle 42, which is fixed to the end of static mixing tube 38, has a series of beveled holes placed so as to distribute blended polyurethane foam onto the inside of mold 40 from its center. In FIG. 2, nozzle 42 is shown configured to create a semi-circular spray pattern, although other configurations are possible. The semi-circular spray pattern shown allows the simultaneous application of material along a strip of mold 40 extending from the stem at one pole to a location next to hole 20, and an inch or two wide.

In one suitable manufacturing-line process, a line of molds 40, with the stem ends down, are placed on and moved along by a conveyor 44. Conveyor 44 first moves mold 40 to a first spraying station 46, at which a mold-release agent is sprayed on the inside of each mold 40. The release agent should be compatible with polyurethane foam and allow the finished product to be removed from the mold without sticking. Liquid silicone is one suitable material for such an agent.

Next, conveyor 44 moves mold 40 to a second spraying station 48, at which point static mixing tube 38 is extended into mold 40 so as to locate nozzle 42 (at the end of the tube) at the center of mold 40. Alternatively, conveyor 44 can lift mold 40 around tube 38. As polyurethane foam spraying begins, nozzle 42 rotates, or mold 40 revolves around nozzle 42, so that polyurethane foam material covers the inside of mold 40 completely to a depth of approximately one inch. FIG. 2 shows example spraying arrangements at the first and second spraying stations 46 and 48, even though the nozzles are outside mold 40, for clarity of illustration. In actual operation, however, the nozzles would spray only when inside molds 40.

Nozzle 42 should be configured so as to allow sufficient material to be sprayed at each "latitude" of mold 40 to result in a relatively uniform depth. Therefore, nozzle 42 should preferably be shaped to allow more material to exit near the "equator" than near the poles, to compensate for the greater surface area around the "equator." Also, slightly more material should be sprayed towards the top hemisphere of the mold, at the end towards the hole, to compensate for gravity. In addition, nozzle 42 should be shaped with a hole directly opposite static mixing tube, to allow sufficient material to be applied to fill stem 16. Finally, nozzle 42 should be shaped so as to reduce the spraying of material at hole 20. Sleeve 43, at some suitable distance from nozzle 42, can be used to block material from exiting hole 20.

After polyurethane foam application is completed, conveyor 44 moves mold 40 away from spraying station 48 to allow the polyurethane foam sufficient time to expand, and the next mold 40 is moved to station 48. Automated line controller 50 controls the timing of the process, such as by controlling conveyor 44 and manifold 36. If possible, controller 50 can interrupt the spraying by turning off the flow of polyurethane foam components through manifold 36, replace one mold 40 with another, and restart the flow through manifold 36, all before the polyurethane foam stranded inside mixing tube 38 and nozzle 42 completes reacting, which could result in blockage. In slower production lines, however, controller 50 can also open the solvent flushing port in manifold 36, to clean out the equipment between the spraying of each mold.

Next, mold 40 is opened, either automatically or manually, and the polyurethane foam substrate is removed. The outside of the removed substrate is sprayed with a cleaning agent, such as alcohol, to remove residual mold release agent, and the substrate can be trimmed if necessary.

Elastomeric coating 14 is then applied as a fluid, either manually or automatically (not shown in FIG. 2). After coating 14 dries, paint or other finishes can be applied on top of coating 14. The substrate must be cured, for approximately four hours in the case of the specific polyurethane foam material identified above, before it can be handled robustly.

Figure 3:
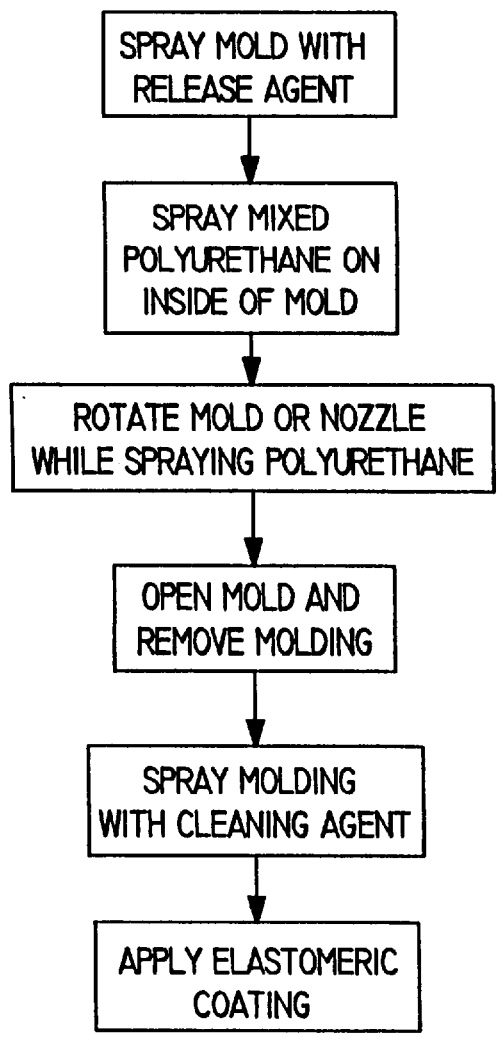
FIG. 3 shows a flowchart of an embodiment of a process suitable for use with the equipment of FIG. 2 to manufacture the example item of FIG. 1.

The process for using such equipment to produce castings, as described above in connection with FIG. 2, is summarized in FIG. 3. The process can be modified for use with substitute equipment or materials or if it is desired to produce a differently shaped item.

Thus, it is understood by those skilled in the art that numerous alternate forms and embodiments of the invention can be devised without departing from its spirit and scope.

I claim:

1. A novelty article comprising:
   (a) a generally spheroidal, rigid shell comprised of polyurethane foam substantially surrounding an empty interior volume and having an external surface shaped and sized to represent a pumpkin;
   (b) wherein the polyurethane foam is of a composition, density, and thickness such that the article can be carved with a pocketknife; and
   (c) a thin coating on the exterior surface of the shell.

2. The article of claim 1 wherein the coating is colored orange.

3. The article of claim 2 wherein the coating is comprised of an acrylic material.

4. The article of claim 2 wherein a plurality of holes are carved through the shell, which holes are shaped and positioned to visually represent a face.

5. The article of claim 2 further comprising a plurality of longitudinal indentations spaced around the external surface of the shell, and a stem-shaped protrusion at an upper portion of the shell.

6. The article of claim 5 wherein the coating has a textured exterior surface.

7. The article of claim 6 wherein the coating is comprised of an acrylic material.

8. The article of claim 1 further comprising a plurality of holes piercing the shell.

9. The article of claim 8 wherein the holes are shaped and positioned to visually represent a face.

10. The article of claim 1 wherein said external surface contains a plurality of longitudinal indentations spaced around the surface of the shell.

11. The article of claim 1 further comprising at least one painted area on the coating giving the shell the visual appearance of a pumpkin.

12. The article of claim 1 further comprising a stem-shaped protrusion at an upper portion of the shell.

13. The article of claim 1 further comprising a plurality of longitudinal indentations spaced around the external surface of the shell, at least one painted area on the coating giving the shell the visual appearance of a pumpkin, and a stem-shaped protrusion at an upper portion of the shell.

14. The article of claim 1 wherein the coating has a textured exterior surface.

15. The article of claim 1 wherein the coating is comprised of an acrylic material.

16. The article of claim 1 wherein the shell has a substantially uniform thickness.

17. The article of claim 1 wherein the shell does not completely surround the interior volume.

18. The article of claim 1 wherein a lower portion of the shell has an opening to the interior volume, a bottom portion of which opening forms a generally flat surface.

19. The article of claim 18 further comprising a source of light inside the shell.

20. The article of claim 1 wherein the shell has a substantially uniform thickness, wherein the shell does not completely surround the interior volume, and wherein a lower portion of the shell has an opening to the interior volume, a bottom portion of which opening forms a generally flat surface.

21. The article of claim 1 wherein the shell is comprised of polyurethane foam material having a nominal density of about 2.5–3.0 pounds per cubic foot.

22. The article of claim 1 further comprising a source of light inside the shell.

23. The article of claim 1 wherein the rigid shell is shaped as an irregular spheroid.

24. The article of claim 1 wherein the coating has a material composition and color that is substantially opaque to ultraviolet radiation.

25. The article of claim 1 wherein the shell has a painted exterior.

26. The article of claim 25 further comprising a plurality of holes piercing the shell.

27. The article of claim 26 wherein the coating is applied in liquid form and wherein the painted exterior is colored orange.

28. The article of claim 27 wherein the exterior is textured.

29. The article of claim 1 wherein the shell completely surrounds the interior volume with the exception of a single opening to the interior volume at a lower portion of the shell.

* * * * *